US010852041B2

(12) United States Patent
Rite et al.

(10) Patent No.: US 10,852,041 B2
(45) Date of Patent: Dec. 1, 2020

(54) HVAC SYSTEM WITH ELECTRONICALLY CONTROLLED EXPANSION VALVE

(71) Applicant: Trane International Inc., Piscataway, NJ (US)

(72) Inventors: Raymond Walter Rite, Tyler, TX (US); Don Alan Schuster, Lindale, TX (US); Jonathan Thrift, Jacksonville, TX (US)

(73) Assignee: Trane International Inc., Davidson, NC (US)

( * ) Notice: Subject to any disclaimer, the term of this patent is extended or adjusted under 35 U.S.C. 154(b) by 891 days.

(21) Appl. No.: 14/480,510

(22) Filed: Sep. 8, 2014

(65) Prior Publication Data

US 2015/0068231 A1 Mar. 12, 2015

Related U.S. Application Data

(60) Provisional application No. 61/875,031, filed on Sep. 7, 2013.

(51) Int. Cl.
*F25B 49/00* (2006.01)
*F25B 49/02* (2006.01)
*F25B 41/06* (2006.01)

(52) U.S. Cl.
CPC ............ *F25B 49/02* (2013.01); *F25B 41/062* (2013.01); *F25B 2600/02* (2013.01);
(Continued)

(58) Field of Classification Search
CPC .............. F25B 49/02; F25B 2600/2513; F25B 41/062; F25B 2600/112;
(Continued)

(56) References Cited

U.S. PATENT DOCUMENTS 4,506,518 A * 3/1985 Yoshikawa .......... F24F 11/0009
251/129.11
4,689,968 A 9/1987 McCulloch et al.
(Continued)

FOREIGN PATENT DOCUMENTS

| JP | 2004271066 A | * | 9/2004 |
| JP | 2005156030 A | * | 6/2005 |
| JP | 2008256315 A | * | 10/2008 |

OTHER PUBLICATIONS

Endo et al., Heat Pump Apparatus, Jun. 16, 2005, JP2005156030A, Whole Document.*

(Continued)

*Primary Examiner* — Larry L Furdge
(74) *Attorney, Agent, or Firm* — Taft Stettinus & Hollister LLP

(57) ABSTRACT

A two temperature electronic expansion valve control for variable speed compressors that utilizes a correlation between airflow percentage and heat exchanger pressure drop to control the operation of an expansion valve. An indoor airflow percentage request may be communicated from an outdoor controller to an air handler controller. Using a correlation between airflow percentage and pressure drop across the heat exchanger, the airflow percentage may be used in predicting an outlet pressure of refrigerant exhausted from the heat exchanger. The predicted pressure drop may be used in determining a saturated temperature for the exhausted refrigerant. The determined saturated temperature may be compared to a sensed temperature of the refrigerant at the outlet of the heat exchanger to determine a superheat value, which is compared to a reference superheat value in determining the degree to open or close the expansion valve.

20 Claims, 4 Drawing Sheets

(52) U.S. Cl.
CPC ..... *F25B 2600/11* (2013.01); *F25B 2600/112* (2013.01); *F25B 2600/19* (2013.01); *F25B 2600/2513* (2013.01); *F25B 2700/21163* (2013.01); *Y02B 30/743* (2013.01)

(58) Field of Classification Search
CPC ........ F25B 2700/21163; F25B 2600/19; F25B 2600/11; F25B 2600/02
See application file for complete search history.

(56) References Cited

U.S. PATENT DOCUMENTS

| | | | |
|---|---|---|---|
| 4,807,445 A | | 2/1989 | Matsuoka et al. |
| 5,000,009 A | * | 3/1991 | Clanin ................. F25B 41/062 62/115 |
| 5,181,392 A | * | 1/1993 | Itoh ........................ F24F 3/153 165/240 |
| 5,475,986 A | * | 12/1995 | Bahel ....................... F24F 1/00 236/51 |
| 5,809,789 A | * | 9/1998 | Baker ................... F25B 47/022 62/156 |
| 6,260,368 B1 | | 7/2001 | Redlich |
| 7,784,296 B2 | | 8/2010 | Chen et al. |
| 2003/0159455 A1 | * | 8/2003 | Aikawa ................. B60H 1/005 62/225 |
| 2004/0261435 A1 | * | 12/2004 | Chen ....................... F25B 9/008 62/190 |
| 2007/0006606 A1 | * | 1/2007 | Kaga ....................... F25C 1/147 62/354 |
| 2008/0188173 A1 | * | 8/2008 | Chen ........................ F24F 11/77 454/239 |
| 2008/0315000 A1 | * | 12/2008 | Gorthala ............ B60H 1/00785 236/46 C |
| 2009/0223234 A1 | * | 9/2009 | Campbell ............ F24F 11/0001 165/293 |

OTHER PUBLICATIONS

Makino, Heat Exchanger and Air Conditioning System, Oct. 23, 2008, JP2008256315A, Whole Document.*

Hirota, Method for Controlling Degree of Superheat, Sep. 30, 2004, JP2004271066A, Whole Document (Year: 2004).*

* cited by examiner

HVAC SYSTEM WITH ELECTRONICALLY CONTROLLED EXPANSION VALVE

CROSS REFERENCE TO RELATED APPLICATIONS

The present application claims the benefit of U.S. Provisional Patent Application Ser. No. 61/875,031, filed Sep. 7, 2013, which is incorporated herein by reference in its entirety.

BACKGROUND

Embodiments of the present invention generally relate to refrigeration systems. More particularly, embodiments of the present invention relate to controlling the operation of an electronically controlled expansion valve for HVAC systems.

HVAC systems with air handlers, including, for example, air-conditioners and heat pumps, among other HVAC systems, often have an electronic expansion valve (EEV) to control refrigerant flow. The degree to which the EEV is opened or closed may control the amount of refrigerant that flows through the HVAC system, and thereby control the superheat leaving a heat exchanger, such as, for example, an evaporator. Moreover, the EEV may assist in controlling the flow of refrigerant in the HVAC system so that an appropriate amount of superheat leaves the evaporator. Superheat leaving the evaporator is typically defined as the difference between refrigerant gas temperature leaving the evaporator and saturated refrigerant temperature leaving the evaporator.

Determination of the superheat leaving the evaporator often involves, at least in part, a determination of a pressure drop in the refrigerant across the evaporator. Further, traditionally, many HVAC systems are two speed systems, and more specifically, refrigeration flow is either typically at a high speed or a low speed. Thus, for such systems, a first, high speed pressure drop value for refrigerant across the evaporator is typically anticipated when the system is operating in the high speed mode, and a different second, low speed pressure value is anticipated when the system is operating in the low speed mode. Further, the first, high speed pressure drop value and the second, low speed pressure drop value are often fixed values in that the values are not adjusted to accommodate for changes in the HVAC system.

However, for variable flow systems, refrigerant flow typically continuously varies. Therefore, using fixed values for anticipated pressure drop of refrigerant across the evaporator may result in inaccurate superheat values. Yet, inaccurate superheat values may cause over or under compensation in the positioning of the EEV, thereby resulting in the EEV releasing too much, or, alternatively, not enough, refrigerant into the refrigerant flow. Thus, there is a need to develop a means to continuously determine the pressure drop across a heat exchanger, such as, for example, the pressure drop of refrigerant across an evaporator, as the flow rate of refrigerant in the HVAC system varies.

BRIEF SUMMARY

An aspect of the present invention is an HVAC system having a heat exchanger and a fan, the fan being adapted to flow air toward the heat exchanger. Additionally, the fan is controlled in response to an airflow percentage request. The HVAC system further includes an expansion valve that is in fluid communication with the heat exchanger, the expansion valve being configured to control a flow of a refrigerant. Additionally, the HVAC system includes a controller that is adapted to control the operation of the expansion valve based at least in part on a correlation between a drop in a pressure in the heat exchanger and the airflow percentage request.

Another aspect of the present invention is a method for controlling the release of refrigerant from an electronically controlled expansion valve. The method includes determining an airflow percentage for the operation of a fan, the airflow percentage corresponding to a quantity or rate of flow of air to a heat exchanger. Further, a correlation between airflow percentage and pressure drop across the heat exchanger is used to determine an estimated pressure drop. Additionally, an outlet pressure for refrigerant exhausted from the heat exchanger is determined based on an inlet pressure of refrigerant at an inlet of the heat exchanger and the estimated pressure drop. The method further includes determining, using at least the outlet pressure, a heat exchanger exit saturation temperature and sensing, by an outlet temperature sensor, an outlet temperature for refrigerant that is exhausted from the heat exchanger. A comparison of the sensed outlet temperature and the heat exchanger exit saturation temperature is used to derive an estimated superheat value. Further, a flow of refrigerant released by the electronically controlled expansion valve is adjusted based on an outcome of the comparison between the derived estimated superheat value and the reference superheat value.

Another aspect of the present invention is a method for controlling the release of refrigerant from an electronically controlled expansion valve. The method includes determining, by at least one controller, an airflow percentage for a flow of air by a fan to an evaporator. Using at least the determined airflow percentage and a relationship between airflow percentage and refrigerant pressure drop across the evaporator, an estimated refrigerant pressure drop across the evaporator is determined. The method further includes determining a saturated temperature for refrigerant exhausted from the evaporator using at least the estimated refrigerant pressure drop across the evaporator and sensing, by a temperature sensor, an outlet temperature of refrigerant that is exhausted from the evaporator. Additionally, the saturated temperature and the sensed outlet temperature of refrigerant are compared to determine an estimated superheat value that is compared to a reference superheat value. The method further includes adjusting the release of refrigerant from the electronically controlled expansion valve based on the outcome of the comparison between the estimated superheat value and the reference superheat value.

Another aspect of the present invention is an HVAC system having an electronically controlled expansion valve. Other embodiments include apparatuses, systems, devices, hardware, methods, and combinations for HVAC systems. Further embodiments, forms, features, aspects, benefits, and advantages of the present application will become apparent from the description and figures provided herewith.

BRIEF DESCRIPTION OF THE DRAWINGS

The description herein makes reference to the accompanying figures wherein like reference numerals refer to like parts throughout the several views.

Figure 1:
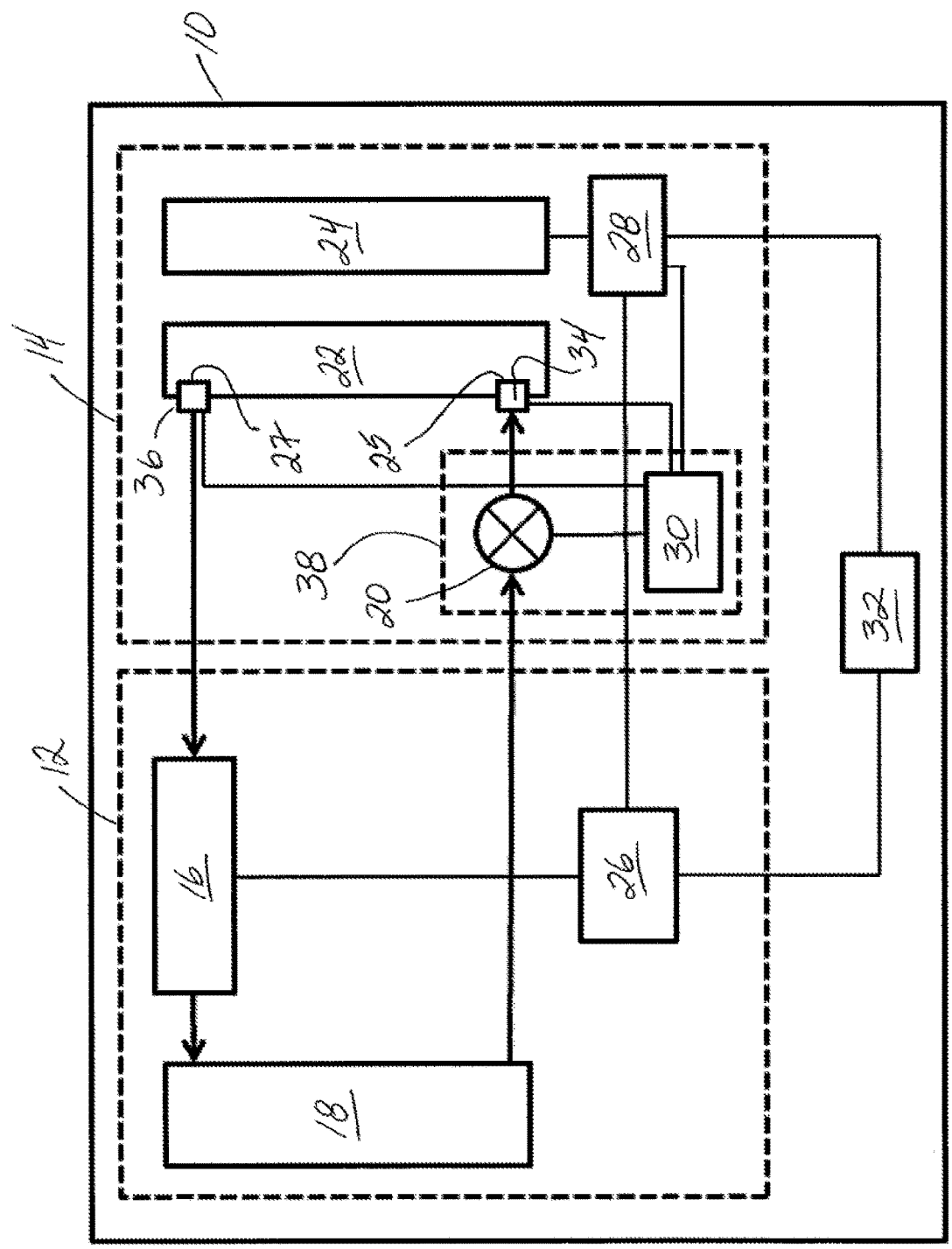
FIG. 1 illustrates a schematic diagram of some aspects of a non-limiting example of an HVAC system in accordance with an embodiment of the present invention.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DESCRIPTION OF THE ILLUSTRATED EMBODIMENTS

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

FIG. 1 illustrates some aspects of a non-limiting example of an HVAC system 10 in accordance with an embodiment of the present invention. According to certain embodiments, the HVAC system 10 includes an outdoor heat exchanger unit 12 and an indoor heat exchanger unit 14, such as, for example, an air handler. In other embodiments, the HVAC system 10 may be housed in a single enclosure, or may take other forms that may be solely indoors or solely outdoors, or extend between indoors and outdoors. Additionally, according to certain embodiments, the HVAC system 10 is a refrigeration system of any type that employs an expansion valve and an evaporator.

In the illustrated embodiment in which the HVAC system 10 is a refrigeration system, the outdoor heat exchanger unit 12 includes a compressor 16 and a condenser 18. According to certain embodiments, the compressor 16 is a variable speed compressor. The indoor heat exchanger unit 14 may include an expansion valve 20, an evaporator 22, and a fan or blower 24. Additionally, the HVAC system 10 may include one or more controllers, such as, for example, a first controller 26, a second controller 28, a third controller 30. In the illustrated embodiment, the first controller 26 is shown as being part of the outdoor heat exchanger unit 12, while the second and third controllers 28, 30 are part of the indoor heat exchanger unit 14. Further, the third controller 30 can be communicatively coupled to the expansion valve 20 to form an electronically-controlled expansion valve (EEV) 38.

Although the controllers 26, 28, 30 are illustrated in FIG. 1 as separate components, according to other embodiments, one or more of the controllers 26, 28, 30 may be combined or may have their functions distributed across one or more other controllers, and may receive other inputs and/or provide other outputs beyond those illustrated and described herein. Additionally, the controllers 26, 28, 30 may be positioned at a variety of locations, including with the outdoor heat exchanger unit 12 and/or the indoor heat exchanger unit 14. The controllers 26, 28, 30 may be adapted to perform a variety of functions relating to the operation of the HVAC system 10. For example, according to certain embodiments, the one or more controllers 26, 28, 30 are adapted to sense room temperature, determine system demand, determine commands for operation of various components of the HVAC system 10, and issue those determined commands, among other functions.

The HVAC system 10 may further include a thermostat 32 that is operably coupled to the outdoor heat exchanger unit 12 and/or the indoor heat exchanger unit 14. For example, in the illustrated embodiment, the thermostat 32 is coupled to the first controller 26 and the second controller 28 such that commands and information may be at least communicated from, and/or between, the thermostat 32 and the first and second controllers 26, 28.

The HVAC system 10, and in particular the indoor heat exchanger unit 14, also includes an inlet temperature sensor 34 and an outlet temperature sensor 36. As shown in FIG. 1, according to the illustrated embodiment, the inlet and outlet temperature sensors 34 and 36 may be communicatively coupled to the third controller 30, which may be part of the indoor heat exchanger unit 14. Further, the inlet temperature sensor 34 may be disposed adjacent to, or upstream of, the inlet of evaporator 22. For example, according to certain embodiments, the inlet temperature sensor 34 is coupled to a distributor tube at the inlet 25 to the evaporator 22 to measure saturated refrigerant temperature of the refrigerant that is being delivered to the evaporator 22. Thus, according to the illustrated embodiment, the inlet temperature sensor 34 is positioned to sense the temperature of refrigerant at that is being delivered to, or is received by, the evaporator 22. Similarly, the outlet temperature sensor 36 is positioned to sense the temperature of refrigerant that is being, or has been, exhausted from the evaporator 22. For example, the outlet temperature sensor 36 may be coupled to a refrigerant tube that is leaving the evaporator 22, and thereby the outlet temperature sensor 36 may measure a gas temperature of the exhausted refrigerant.

According to the illustrated embodiment in which the HVAC system 10 is a refrigeration system, a refrigerant is compressed by the compressor 16, rejects heat at the condenser 18, and expands in the expansion valve 20. Refrigerant released from the expansion valve 20 may flow to the evaporator 22, where the temperature of the refrigerant may be sensed by the inlet temperature sensor 34. The refrigerant may then retain heat at the evaporator 22 before being exhausted from the evaporator 22. Further, according to the illustrated embodiment, the amount of heat retained by the refrigerant in the evaporator 22 may be at least partially controlled by controlling the volumetric flow of air to or over the evaporator 22. Thus, control of the volumetric flow of air delivered to the evaporator 22 may be controlled via controlling the operation of the fan 24. Additionally, as previously discussed, the temperature of the refrigerant that is, or is being, exhausted from the evaporator 22 is sensed by the outlet temperature sensor 36 at least before the refrigerant is returned to the compressor 16.

According to the certain embodiments, the first controller 26 may be an outdoor controller. Moreover, according to certain embodiments, the first controller 26 may be an airflow control board. Further, as shown in FIG. 1, the first controller 26 may be communicatively coupled to the compressor 16 such that the first controller 26 may operably supply signals for controlling the operation of the compressor 16. Additionally, the first controller 26 may also be communicatively coupled to the second controller 28. According to such an embodiment, the first controller 26 is operative to supply an airflow request, such as, for example, a request communicating airflow percentage that is to be attained by operation of the fan 24, to the second controller 28.

According to certain embodiments, the airflow percentage may correspond to an operating parameter of the fan 24, or to a characteristic of the airflow being blown by the fan 22 to, and/or about, the evaporator 22. Further, according to certain embodiments, the airflow percentage may be proportional to the speed/capacity of the compressor 16. For example, according to certain embodiments, the airflow percentage may correspond to a volumetric flow rate for the airflow that is to flow to the evaporator 22 via operation of the fan 24. According to other embodiments, the airflow percentage may correspond to a speed of the fan 24, such as, for example, a duty cycle.

According to the illustrated embodiment, the second controller 28 may be an air handler controller. Further, the second controller 28 is communicatively coupled to the fan 24. As previously discussed, the fan 24 is configured to provide an airflow to, and/or about at least a portion of, the evaporator 24. Moreover, according to the illustrated embodiment, the second controller 28 is operative to control the output of fan 24 based on the airflow request received from first controller 26. For example, according to certain embodiments, the second controller 28 is configured to the control the speed at which the fan 24 operates based on information contained in the airflow percentage request. By controlling the speed of the fan 24, the second controller 28 may control the volumetric flow of air that the fan 24 blows to and/or about the evaporator 22, and thereby control the temperature of the airflow that is exhausted, or flows away, from the evaporator 22.

The second controller 28 is communicatively coupled to the third controller 30. As previously discussed, in the illustrated embodiment, the third controller 30 can be communicatively coupled to the expansion valve 20 to form the electronically-controlled expansion valve (EEV) 38. According to such an embodiment, the third controller 30 may be used to control the flow of refrigerant that is released from the expansion valve 20. For example, the third controller 30 may be adapted to control the degree to which the expansion valve 20 is open or closed. According to certain embodiments, the third controller 30 may be operably connected to an actuator of the expansion valve, such as, for example, a motor, that is adapted to alter the position of a valve component of the expansion valve 38 that is used to provide varying degrees, if any, to release of refrigerant from the expansion valve 20.

Figure 2:
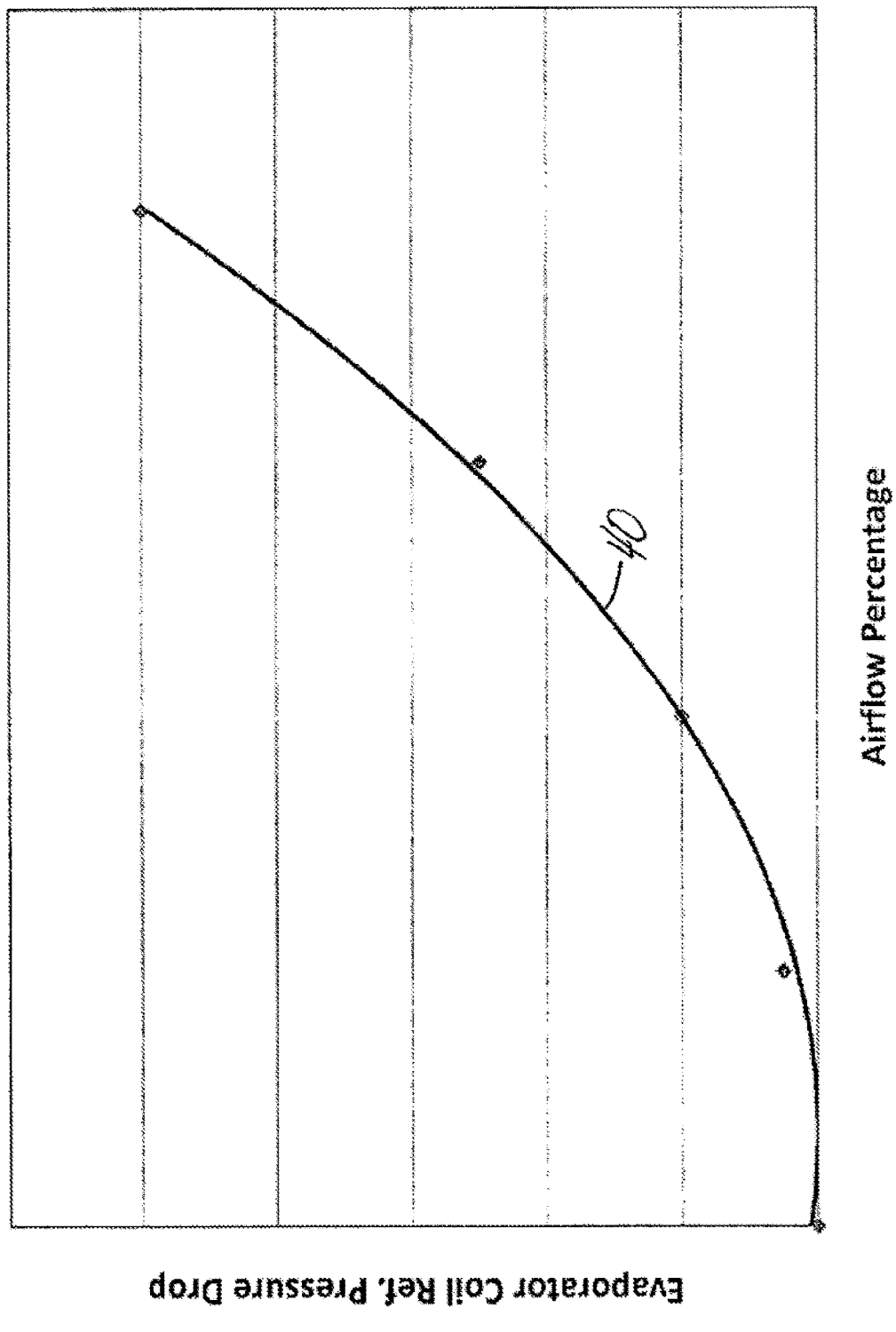
FIG. 2 illustrates an exemplary plot depicting a relationship between evaporator pressure drop and airflow percentage in accordance with an embodiment of the present invention.

FIG. 2 illustrates an example of a correlation 40 between an evaporator reference pressure drop and an airflow percent. Moreover, as airflow percentage may be directly related to refrigerant flow rate, airflow percentage may be used as a surrogate, with use of the correlation 40, to estimate an evaporator 22 pressure drop, and more specifically, a drop in refrigerant pressure, at a number of operating points along the evaporator 22. Thus, the airflow percentage may permit a determination of pressure drop of refrigerant across the evaporator 22 as refrigerant flow in the system 10 varies. Moreover, the evaporator reference pressure drop may indicate an estimated or predicted pressure drop, and more specifically, a refrigerant pressure drop, between a first pressure at or around the inlet 25 of the evaporator 22, and a second pressure or around the outlet 27 of the evaporator 22.

According to certain embodiments, one or more correlation algorithms, look-up tables, models, maps, or other correlation sources may be derived empirically and/or by calculation, including, for example, by hand calculations, actual or virtual testing, and/or computer modeling. For example, according to certain embodiments, testing and/or modeling of the impact the airflow percentage has on refrigerant pressure drop across the evaporator 22 at a variety of different operating conditions may be used to derive a correlation algorithm that corresponds to the correlation between airflow percentage and pressure drop across the evaporator 22. Alternatively, such testing and/or modeling may be used to derive one or more look-up tables that provide the refrigerant pressure drop across the evaporator 22. The derived correlation algorithm(s), table(s), maps, or other correlation 40 providing resources may be stored in one or more of the controllers 26, 28, 30, such as, for example in a memory of one or more of the controllers 26, 28, 30.

The EEV 38 is configured to regulate the superheat of the refrigerant at a desired location in system 10, such as, for example, the superheat of the refrigerant that is exiting the evaporator 22. Therefore, according to certain embodiments, the EEV 38 may store, such as, for example, in a memory associated with, or otherwise in communication with, the third controller 30, a set-point or reference superheat value. The set-point or reference superheat value may correspond to a superheat value or level that the system 10 may seek to attain/maintain. Moreover, the set-point or reference superheat value may provide a measuring point for determining whether the superheat being estimated or predicted as being attained by the system 10 requires an adjusted in the operation of the expansion valve 20, and more specifically, a change in the flow of refrigerant from the expansion valve 20. Further, according to the illustrated embodiment, the EEV 38 may also store, or otherwise have access to, one or more properties of the refrigerant, such as, for example, thermodynamic properties of the refrigerant.

Figure 3:
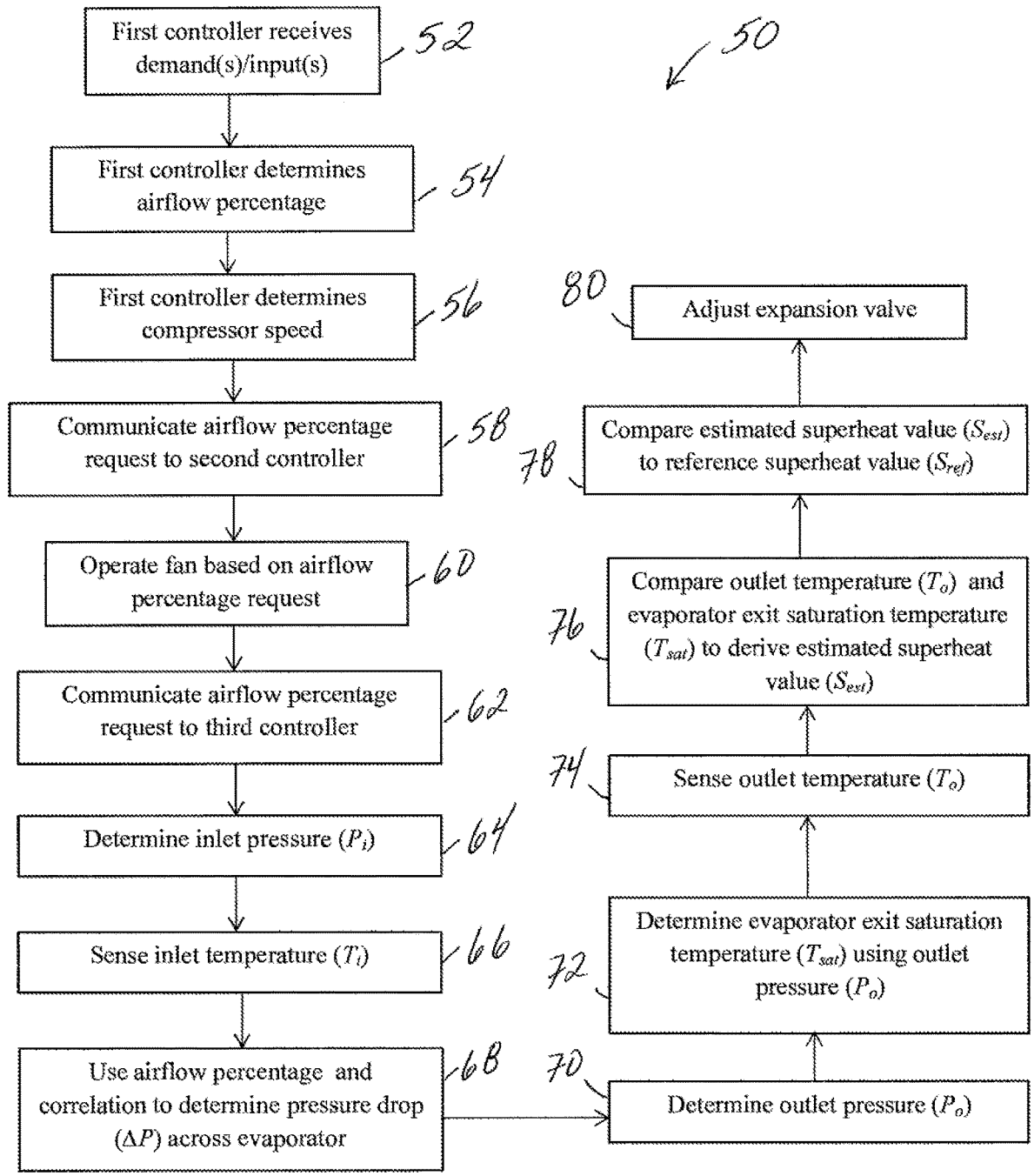
FIG. 3 illustrates a flow chart for controlling the operation of an expansion valve according to an illustrated embodiment of the present invention.
Figure 4:
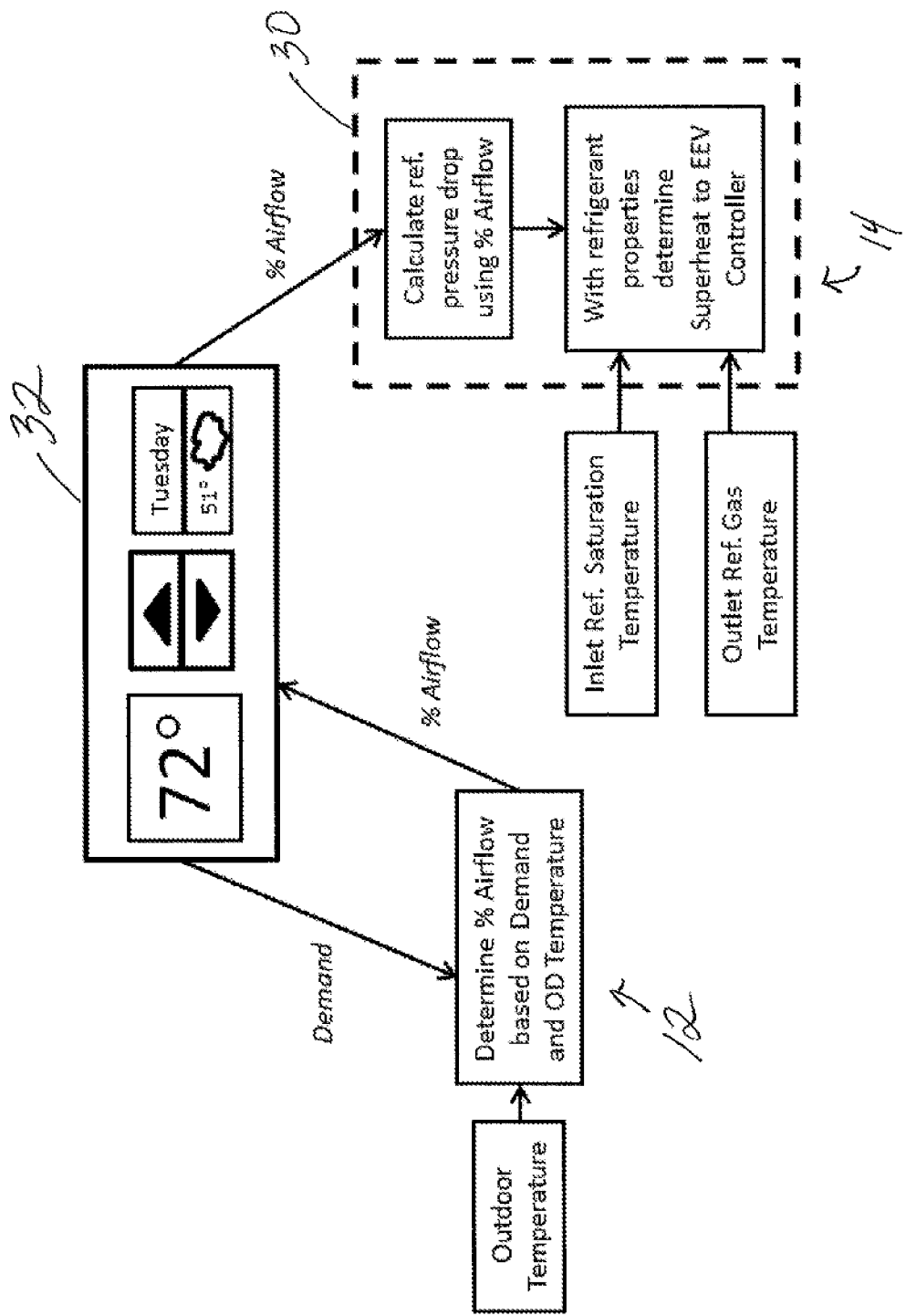
FIG. 4 illustrates a diagrammatic depiction of some aspects of the operation of a refrigeration system in accordance with an embodiment of the present invention.

FIGS. 3 and 4 illustrate an exemplary process 50 for controlling the EEV 38 according to an embodiment of the present invention. While FIG. 3 is shown and described herein as containing certain steps, according to other embodiments, certain steps may be removed and/or added. Additionally, according to certain embodiments, the order in which steps occur may be different for different embodiments.

At step 52, the first controller 26 may receive one or more inputs or demands. The inputs or demands may be associated with a number of conditions or settings. For example, referencing FIGS. 3 and 4, such demand may be based on a demand signal communicated to the first controller 26 from the thermostat 32. Such a demand from the thermostat 32 may be associated with maintaining the associated building or structure at a reference temperature, and/or a change in the reference temperature. Additionally, as shown in FIG. 4, the first controller 26 may receive a demand associated with an outdoor temperature. At step 54, based on at least the received demands or inputs, the first controller 26 may determine an airflow requirement, such as, for example an airflow percentage that is to be delivered by fan 24. Further, at step 54, the first controller 26 may also determine a flow rate for air that is to be delivered to, or about, the condenser 18. At step 56, based on at least similar demands that were used to determine the airflow percentage, the first controller 26 may also determine an operating speed for the compressor 16.

As shown in FIG. 3, and further illustrated in FIG. 4, at step 58, the first controller 26 may communicate the airflow percentage request to at least the second controller 28 and/or to the thermostat 32. At step 60, the second controller 28 directs the operation of the fan 24 based on the airflow percentage request. For example, the second controller 28 may transmit a command, signal, information, data, voltage, or the like to the fan 24 that is used to control the operation of the fan 24, such as, for example, the speed at which the fan 24 is operating.

According to the illustrated embodiment, at step 62, the airflow percentage and/or the airflow percentage request is communicated to the third controller 30. According to the illustrated embodiment, the airflow percentage and/or the airflow percentage request is communicated to the third controller 30 by the second controller 28. However, according to other embodiments, the airflow percentage and/or the airflow percentage request is communicated to the third controller 30 by the first controller 26.

At step 64, the inlet pressure ($P_i$) of the evaporator 22, and more specifically, the pressure of refrigerant at, or adjacent to, the inlet 25 of the evaporator 22 may be ascertained by one or more of the controllers 26, 28, 30, such as, for example, by the third controller 30. For example, because the refrigerant supplied to the evaporator 22 is a saturated mixture, and based on known thermodynamic properties of the refrigerant, the inlet pressure ($P_i$) of the refrigerant at or around the inlet 25 of the evaporator 22 may be ascertained. At step 66, using the inlet temperature sensor 34, the temperature ($T_i$) of the refrigerant at or adjacent to the inlet 25 of the evaporator 22 may be sensed or otherwise determined. According to certain embodiments, rather than determining the inlet pressure ($P_i$) of the refrigerant at the inlet 25 of the evaporator 22 as discussed above with respect to step 64 based on the refrigerant being a saturated mixture, the temperature sensed at step 66 by the inlet temperature sensor 34, as well as the thermodynamic properties of the refrigerant, may be used by one or more of the controllers 26, 28, 30 to determine the inlet pressure ($P_i$) of the refrigerant.

At step 68, with the inlet pressure of the refrigerant determined, the correlation 40 between airflow percentage and pressure drop across the evaporator 22 may be employed. Moreover, the derived correlation 40 allows for the use of the previously determined airflow percentage to determine the predicted or estimated pressure change or drop ($\Delta P$) of the refrigerant across the evaporator 22, as illustrated in FIG. 2. For example, as discussed above, according to certain embodiments, a memory of one or more of the controllers 26, 28, 30, such as, for example, the third controller 30, may contain one or more correlation algorithms or tables that allow for determination of the pressure drop ($\Delta P$) using the airflow percentage. At step 70, an outlet pressure ($P_o$) of the evaporator 22, and more specifically, the pressure of refrigerant at, or adjacent to, the outlet 27 of the evaporator 22 may be derived, such as, for example, by the third controller 30, by subtracting the estimated pressure drop ($\Delta P$), as determined at step 68, from the inlet pressure ($P_i$).

At step 72, using the determined outlet pressure ($P_o$) and the thermodynamic properties of the refrigerant, one or more of the controllers 26, 28, 30, such as, for example, the third controller 30, may determine an evaporator exit saturation temperature ($T_{sat}$) for the refrigerant at the outlet 27 of the evaporator 22. Additionally, at step 74, an outlet temperature ($T_o$) for refrigerant that is exiting the evaporator 22 may be sensed by the outlet temperature sensor 36. At step 76, a controller 26, 28, 30, such as, for example, the third controller 30, may evaluate or compare the calculated evaporator exit saturation temperature ($T_{sat}$) with the sensed or measured outlet temperature ($T_o$) to derive an estimated superheat value ($S_{est}$). At step 78, a controller 26, 28, 30, such as the third controller 30, compares the derived estimated superheat value ($S_{est}$) to a reference superheat value ($S_{ref}$). According to certain embodiments, the reference superheat value ($S_{ref}$) may be stored in the memory of one or more of the controllers 26, 28, 30, such as, for example, a memory of, or accessible to, the third controller 30. Differences between the estimated superheat value ($S_{est}$) and the reference superheat value ($S_{ref}$) may provide an indication of whether the amount or rate of refrigerant that is flowing into at least the evaporator 22 is to be increased or decreased. Moreover, the estimated superheat value ($S_{est}$) may provide feedback for comparison with the set-point superheat value ($S_{ref}$), to determine the degree, if any, the expansion valve 20 should be opened and closed, and thereby control the flow of refrigerant that is being released from the expansion valve 20.

At step 80, based on the results of the comparison of between the estimated superheat value ($S_{est}$) and the reference superheat value ($S_{ref}$), the expansion valve 20 may, or may not, be adjusted so as to alter the amount of refrigerant that is flowing through the expansion valve 20. Additionally, the process 50 may be continuous so that the degree that the expansion valve 20 is opened/closed can vary as flow conditions of the refrigerant changes. Such consideration of continuous changes in refrigerant flow may allow for a more accurate pressure calculation for refrigerant that is leaving the evaporator, and thus result in better superheat control.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

The invention claimed is:

1. An HVAC system comprising:
   a heat exchanger;
   a fan adapted to flow air toward the heat exchanger, the fan controlled in response to an airflow percentage request;
   an expansion valve in fluid communication with the heat exchanger, the expansion valve configured to control a flow of a refrigerant; and a controller configured to control the operation of the expansion valve, the controller having a memory that includes a correlation between a drop in a pressure in the heat exchanger and the airflow percentage request, the controller configured to form a control signal to the expansion valve based on the correlation stored in the memory of the controller, and the controller further configured to determine an outlet pressure of the refrigerant exhausted from the heat exchanger based in part on the correlation between the drop in the pressure in the heat exchanger and the airflow percentage request where airflow percentage request is used as input to the correlation and drop in the pressure is an output from the correlation, such that the outlet pressure is determined based on an inlet pressure of refrigerant at an inlet of the heat exchanger and is determined on the basis of the drop in pressure which is output from the correlation.

2. The HVAC system of claim 1, wherein the airflow percentage request corresponds to a quantity or rate of air that the fan is to flow to the heat exchanger.

3. The HVAC system of claim 2, wherein the drop in the pressure is a drop of a refrigerant pressure, the controller being further adapted to determine an evaporator exit saturation temperature based on at least the outlet pressure.

4. The HVAC system of claim 3, further including an outlet temperature sensor adapted to sense an outlet temperature of refrigerant exhausted from the heat exchanger, and wherein the controller is further adapted to evaluate the outlet temperature and the evaporator exit saturation temperature to determine an estimated superheat value.

5. The HVAC system of claim 4, wherein the controller is further adapted to issue a command to adjust the flow of refrigerant based on a comparison of the estimated superheat value to a reference superheat value.

6. The HVAC system of claim 4, wherein the heat exchanger is an evaporator, and further including an inlet temperature senor adapted to sense an inlet temperature of refrigerant being received by the heat exchanger, and wherein the controller is adapted to determine an inlet pressure using at least the sensed inlet temperature, the controller further adapted to determine the outlet temperature using at least the sensed inlet temperature and the correlation between drop of the pressure in the heat exchanger and the airflow percentage request.

7. The HVAC system of claim 6, wherein the heat exchanger is part of an indoor exchanger unit, and further including an outdoor heat exchanger unit having a condenser and a compressor.

8. The HVAC system of claim 7, wherein the controller is further adapted to determine the airflow percentage request and an operating speed of the compressor based on one or more demands on the HVAC system.

9. A method for controlling the release of refrigerant from an electronically controlled expansion valve, the method comprising:
determining an airflow percentage for the operation of a fan, the airflow percentage corresponding to a quantity or rate of flow of air to a heat exchanger;
determining an estimated pressure drop across the heat exchanger using a direct correlation which is stored in a memory of a controller where the direct correlation is between airflow percentage and estimated pressure drop across the heat exchanger and where airflow percentage is used as input to the direct correlation and estimated pressure drop is an output from the direct correlation;
determining an outlet pressure for refrigerant exhausted from the heat exchanger based on an inlet pressure of refrigerant at an inlet of the heat exchanger and the estimated pressure drop;
determining, using at least the outlet pressure, a heat exchanger exit saturation temperature;
sensing, by an outlet temperature sensor, an outlet temperature for refrigerant exhausted from the heat exchanger;
deriving, from a comparison of the sensed outlet temperature and the heat exchanger exit saturation temperature, an estimated superheat value; and
adjusting a flow of refrigerant released by the electronically controlled expansion valve based on an outcome of the comparison between the derived estimated superheat value and the reference superheat value.

10. The method of claim 9, wherein the heat exchanger is an evaporator.

11. The method of claim 10, wherein the step of determining the airflow percentage includes receiving, by a controller, one or more system demands or input, and further including the step of operating the fan to attain the determined airflow percentage.

12. The method of claim 11, further including the step of sensing, by an inlet temperature sensor, an inlet temperature of refrigerant being received by the heat exchanger.

13. The method of claim 12, further including the step of determining the inlet pressure of refrigerant received by the heat exchanger using the sensed inlet temperature.

14. The method of claim 13, further including the steps of communicating the airflow percentage as an airflow percentage request from an outdoor controller to an air handler controller and determining, by the outdoor controller, an operating speed for a compressor, the compressor being in fluid communication with the electronically controlled expansion valve.

15. The method of claim 14, wherein the correlation between airflow percentage and estimated pressure drop across the heat exchanger is a correlation algorithm stored in a memory of at least one of the at least one controller.

16. A method for controlling the release of refrigerant from an electronically controlled expansion valve, the method comprising:
determining, by at least one controller, an airflow percentage for a flow of air by a fan to an evaporator;
determining an outlet pressure of refrigerant exhausted from the evaporator using (1) an inlet pressure of refrigerant to the evaporator, and (2) the determined airflow percentage and a computational relationship stored in a memory of the at least one controller between airflow percentage and an estimated refrigerant pressure drop across the evaporator where airflow percentage is used as input to the computational relationship and estimated refrigerant pressure drop is an output from the computational relationship;
determining a saturated temperature for refrigerant exhausted from the evaporator using at least the estimated refrigerant pressure drop across the evaporator;
sensing, by a temperature sensor, an outlet temperature of refrigerant exhausted from the evaporator;
comparing the saturated temperature and the sensed outlet temperature of refrigerant to determine an estimated superheat value;
comparing the estimated superheat value to a reference superheat value; and
adjusting the release of refrigerant from the electronically controlled expansion valve based on the outcome of the comparison between the estimated superheat value and the reference superheat value.

17. The method of claim 16, wherein the step of determining the airflow percentage includes, receiving, by the at least one controller, one or more system demands or inputs, and further including the step of operating the fan to attain the determined airflow percentage.

18. The method of claim 17, wherein the relationship between airflow percentage and estimated refrigerant pressure drop across the evaporator is an algorithm stored in a memory of at least one of the at least one controller.

19. The method of claim 17, wherein the airflow percentage is determined by an outdoor controller, and further including the step determining, by the outdoor controller, an operating speed for a compressor, the compressor being in fluid communication with the electronically controlled expansion valve.

20. The method of claim 19, further including the steps of sensing, by an inlet temperature sensor, an inlet temperature of refrigerant being received by the evaporator, and determining an inlet pressure for refrigerant being received by an evaporator using the sensed inlet temperature.

* * * * *